United States Patent [19]

Müller

[11] Patent Number: 4,774,533

[45] Date of Patent: Sep. 27, 1988

[54] COPYING APPARATUS

[75] Inventor: Jürgen Müller, Munich, Fed. Rep. of Germany

[73] Assignee: Agfa-Gevaert AG, Leverkusen, Fed. Rep. of Germany

[21] Appl. No.: 11,502

[22] Filed: Feb. 5, 1987

[30] Foreign Application Priority Data

Feb. 20, 1986 [DE] Fed. Rep. of Germany ....... 3605463

[51] Int. Cl.$^4$ .......................................... G01D 15/00
[52] U.S. Cl. .................................... 346/160; 346/145
[58] Field of Search ............... 346/160, 145, 76 L, 346/107 R, 108; 350/6.8, 6.9, 6.7; 358/300, 302; 400/119

[56] References Cited

U.S. PATENT DOCUMENTS 4,351,005  9/1982  Imai et al. ........................... 346/160
4,417,260  11/1983  Kawai et al. ........................ 346/160

Primary Examiner—Arthur G. Evans
Attorney, Agent, or Firm—Michael J. Striker

[57] ABSTRACT

A copying apparatus, comprises a bottom, a process device for lazer beam graphic representation or for sheet film taking or sheet copying and having a housing, and a handling device for sheet films or sheets handling and having housing, the housing of the processing device being supported on the bottom in a vibration-free manner and arranged in the housing of the handling device in a contact-free manner, the housing of the handling device being arranged on the bottom.

17 Claims, 1 Drawing Sheet

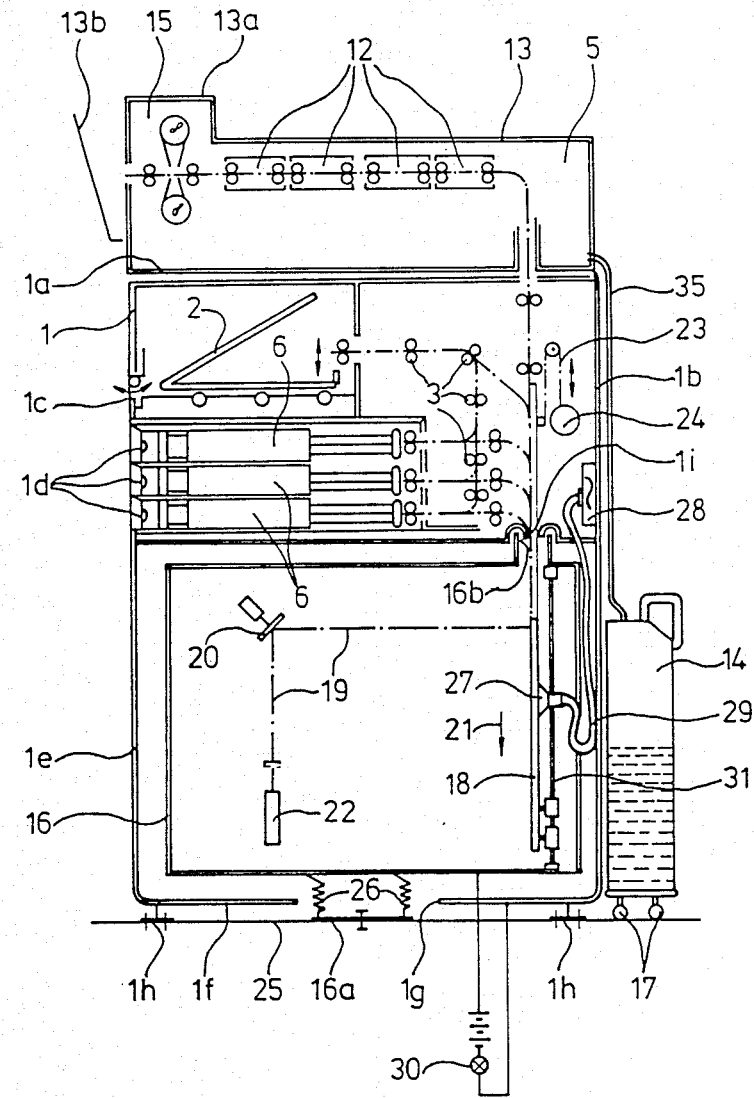

COPYING APPARATUS

BACKGROUND OF THE INVENTION

The present invention relates to a copying apparatus for lazer beam graphic representation, or sheet film taking or sheet copying, which is combined with a handling device for sheet films or sheets.

Copies or pictures of lazer beam graphic representation are taken on special suitable sheet film material. The sheet film material is brought into the lazer beam path as known in the art. The rays of the lazer beam are deflected by a highly sensitive, exactly movable mirror in two coordinate directions. These copying apparatuses for producing so-called hard copy from graphic representations produced by electrical or electronic scanning by means of a lazer beam are extremely sensitive to vibrations in space and shaking for example by transporting means for the utilized sheet films or for sheet film platforms which move these films to picture taking beam path. On the other hand, an associated film platform must be provided with film loading and unloading arrangement and film supply stack. Similar problems can take place during the production of hard copies by means of cathode rays.

SUMMARY OF THE INVENTION

Accordingly, it is an object of the present invention to provide a copying apparatus which avoids the disadvantages of the prior art.

More particularly, it is an object of the present invention to provide the above described combination in a copying apparatus of a copying device and a handling device, in which shaking and vibrations caused by film or sheet transportation and/or movement of copying material support such a film platform or a copying drum, are not transferred to sensitive copying beam path.

In keeping with these objects, and with others which will become apparent hereinafter, one feature of the present invention resides, briefly stated, in that a housing of a processing [copying] device is supported in a vibration-free manner on a bottom and in a contact-free manner in a housing of a handling device which in turn is arranged on the bottom.

When the copying apparatus is designed in accordance with these features, the above mentioned objects of the present invention are achieved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

The single FIGURE of the drawing is a view which schematically shows a copying apparatus in accordance with the present invention, with the combination of a processing [copying] device and a handling device.

DESCRIPTION OF A PREFERRED EMBODIMENT

A sheet film handling device 1, with which for example the present invention can be used, is further described in detail. Its upper side is identified with reference 1a, while its rear side is identified with reference 1b.

An X-ray sheet film cassette 2 is insertable into its upper insertion compartment 1c and automatically opened in a light-tight region. A known transporting roller pair generally identified with reference numeral 3 receives an illuminated film located in the opened cassette 2 for example by a not-shown suction element and transports the illuminated film from the cassette insertion compartment 1c into a device part 5 which projects above the upper side 1a. Under the insertion compartment 1c, further insertion compartments 1d for a so-called dispenser magazine 6 are provided. The dispenser magazines 6 for different film formats can be inserted into them. In a known and not-shown manner, the cassette format is determined automatically and after emptying of cassette 2, not illuminated film of the respective format is supplied from the respective dispenser magazine 6 into the cassette 2. The cassette 2 is closed and transported outwardly from the compartment 1c. The transporting roller pair 3 serves this purpose. Instead of the above described cassette unloading and loading device 1, it is possible to use only a dispenser magazine part 1d, 6 for sheet films or in some cases sheet staple of different formats or also only one format, in connection with the present invention.

The further device part 5 is smaller as compared with the device 1 and projects upwardly beyond the upper side 1a and/or rearwardly beyond the rear side 1b by a distance corresponding to the height of a developing tank or fixing- and watering tank 12 and its housing cover 13 as well as the depth of the optimally sized waste water container 14.

A drying chamber 15 can be arranged at the tank 12 in direction of the front side of the device to increase the respective housing part 13a, and is provided with aerating slots. The increased housing part 13a is provided with an accumulating basket 13b at the front side of the device for the developed and dried film. The housing part 13 which covers the tank 12 so as to form a complete developing arrangements, completes the device 1 to form a compact unit for treating and producing an illuminated sheet film with its development.

The waste water container 14 stands on wheels 17 and is dimensioned so that it is displaceable behind or under the further device part 5 on the rear wall 1b. It is fastenable in its position of use with the rear wall 1b by means of a releasable fastening arrangement. The waste water container 14 can have several chambers, so that different liquids in the tank 12 can be accumulated in accordance with their utilization and remove possibility, separately in the waste water container 14. The waste water container can have an outlet for discharging the waste water or means for pumping the same out. A flexible discharge hose 35 leads from the individual tanks 12 and a not-shown accumulated bath laterally near the transporting rollers 3 and the insertion compartments 1c, 1d, or behind the rear wall 1b, to the waste water container 14 or its chambers. Naturally, the outlet of the tank 12 must be closable manually by a not-shown faucet.

When the sheet film handling device 1 must not be designed for loading and unloading of the sheet film cassettes 2, for example X-ray film cassettes 2, the insertion compartment 1c can be dispensed with. In the event if a separate developing device is provided, or only copying paper must be supplied into the handling device 1, the developing arrangement 5, 12 can be dispensed with. Instead it, only a collecting container for the developed film or the finished copies can be arranged at the respective location.

The handling device 1 has in its lower region a hollow space which is closed by a housing part 1e. The housing part 1e has in it bottom 1f a sufficiently great throughgoing opening 1g and is opened at least at one its side. Thereby, a further device 16 can be inserted into the hollow space.

The further device 16 can be a lazer ray scanner or a cathode ray device which is controlled by picture screen devices. The control lazer or cathode rays are used for producing readable copies [hard copies] of the graphic representations visible in the picture screen device. Generally the film material is used for receiving the controlled lazer rays or cathode rays. The film material can be brought by means of a film gate 18 into the course of rays 19. Two different picture taking possibilities are known. Either the beam of the control rays 19 is deflected by the stationary gate 18, both in lines and normal to the lines over the entire picture field, or the gate 18 is continuously displaced in a coordinate direction 21 with a certain speed and the beam 19 is deflected normally to the same back and forth.

In such devices 16 the copier ray path 19, 20 together with a ray source 22 must not be subjected to vibrations. When the means which form the copier ray path 22, 20, 19 [ray source, not shown optic, mirrors] can be formed in connection with the gate 18, and its drive including a motor 24 and a pulling rope 23, or the insertion compartments 1d, the dispenser magazines 6 and/or the cassette unloading part 1c and/or the developing arrangement 12, 15 and its sheet transporting means are provided, the continuous vibrations and shaking affect the quality of the copying arrangement 22, 20, 19, 18.

The copying device part 16 is inserted into the hollow space limited by the wall 1e without any contact with the handling device 1. The handling device 1 is mounted on a bottom 25 of the device combination 1, 16 so that it cannot be displaced or shaken as identified with reference 1h. The copier device 16 is supported and mounted on the bottom 25 with at least one own supporting surface 16a with interposition of damping members 26 and with a distance from the housing 1, 1e at its all sides. The supporting surface 16a extends through the throughgoing opening 1g of the bottom 1f of the handling device 1. The distance between the supporting surfaces 1h of the handling device 1 and 16a of the copier device 16 must be maintained as great as possible.

The gate 18 is displaceably guided in the copier 16 only along at least one guiding rod 31 which is adjustable in the copier device 16. The drive 23, 24 is arranged in the handling device 1. It is moved through a respective channel 16b of the copier device housing 16 and a channel 1i of the handling device 1 which opens into the same, without contact with the channel 16b. It is movable from a position shown in broken lines in which it is loaded with sheet film from one of the dispenser magazines 6, to a receiving position in the copier device 16 shown in solid lines, and back into the handling device 1 for unloading and further transportation of the illuminated film into the developing device. A control of movement of the gate as well as its loading and unloading can be performed by any control which is known for such devices. For example, one can use the control disclosed in the German document DE-OS No. 3,422,077. The holding of a film between the vertically arranged and movable gate 18 can be performed by a known vacuum suction arrangement 27. The negative pressure arrangement 28 is located in the handling device 1. The connection between the suction arrangement 27 and the negative pressure arrangement 28 can be maintained through a sufficiently long hose 29 which extends without contact through a not-shown slot in the rear wall of the copier device 16.

The copier beam 19 is formed of a beam type which can be identified with an electrographic copier drum, and original paper can be used as copy carrying material. At the location of the gate 18, a copier drum must be used, and its drive and support must also be provided in the handling device 1. The channels 16b, 1i must have such a size that the copier drum is inserted directly into the copier device 16 over such a distance as required for its strip-like illumination. All parts which are required for the electrographic copying process and associated with the drum are arranged advantageously in the handling device 1.

The channel 1i is formed as a funnel which opens into the channel 16b. It would also be possible to form it as a double funnel with guaranteed contact-free guidance of the gate 18 relative to the channel 16b in both movement directions.

Finally, it can be advantageous when one or several electrical or electronic indicating and measuring arrangements 30 be provided between the wall 1e and the wall of the copier device 16. They operate for example by generation of a short circuit when on respective grounds the housing wall of the handling wall 1 and the copier device 16 must be contacted.

When the cassettes 2 to be treated in the cassette unloading and unloading station 1c requires another film material than in the copier station 18, 19, then the dispenser magazines 6 can be supplied with sheet material not of different formats, but instead with sheet material of different types.

All movable parts of the device combination 1, 16 located to the outside the copier ray path 22, 20, 19 are supported in a contact-free manner into the copier device 16, and the copier device 16 is arranged in a contact-free manner in the handling device 1 and supported and mounted independently of the latter on the bottom 25. Thereby, the device combination is provided in which the copier device 16, despite shaking and vibrations in the handling device 1, in supported in a shaking- and vibration-free manner.

It will be understood that each of the elements described above, or two or more together, may also find a useful application in other types of constructions differing from the types described above.

While the invention has been illustrated and described as embodied in a copying apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A copying apparatus, comprising a separate bottom; a processing device for laser beam graphic representation or for sheet film taking or sheet copying and having a housing; a handling device for sheet films or sheets handling and having a housing, said handling device being located above said processing device, said housing of said processing device being supported on said bottom in a vibration-free manner and arranged in said housing of said handling device in a contact-free manner, said housing of said handling device being arranged on said bottom.

2. A copying apparatus, comprising a separate bottom; a processing device for lazer beam graphic representation or for sheet film taking or sheet copying and having a housing; a handling device for sheet films or sheets handling and having a housing, said handling device being located above said processing device, said housing of said processing device being supported on said bottom in a vibration-free manner and arranged in said housing of said handling device in a contact-free manner, said housing of said handling device being arranged on said bottom; and supporting means for supporting said housing of said processing device in a vibration-free manner on said bottom, said housing of said handling device having a lower region provided with a hollow space limited by an openable side wall and a bottom wall for receiving said processing device, said bottom wall being provided with a throughgoing opening through which said supporting means for supporting said housing of said processing device extends.

3. A copying apparatus, comprising a separate bottom; a processing device for lazer beam graphic representation or for sheet film taking or sheet copying and having a housing; a handling device for sheet films or sheets handling and having a housing, said handling device being located above said processing device, said housing of said processing device being supported on said bottom in a vibration-free manner and arranged in said housing of said handling device in a contact-free manner, said housing of said handling device being arranged on said bottom, said processing device having a copying material support movable relative to a copying ray path; driving means arranged in said handling device and driving said copying material support of said processing device; and a transmission arranged between said driving means and said copying material support, said housing of said processing device having a passage, said housing of said handling device also having a passage, said passages being connected with one another, said transmission being at least partially movable in said passages in a contact-free manner relative to said passage of said processing device.

4. A copying apparatus as defined in claim 3, wherein said copying material support is a displaceable sheet film support, said driving means and said handling device being connected through said transmission with said displaceable sheet film support.

5. A copying apparatus as defined in claim 3, wherein said movable copying material support is an electrographic copying drum, said driving means being arranged to drive said electrographic copying drum through said transmission.

6. A copying apparatus as defined in claim 3, wherein said transmission having transmission parts which are movable in said passages in a contact-free manner relative to said passage of said processing device.

7. A copying apparatus as defined in claim 6, wherein said passage of said processing device is wider than said passage of said handling device, said passage of said handling device being funnel-shaped and opening into said passage of said processing device in a contact-free manner.

8. A copying apparatus as defined in claim 7, wherein said passage of said handling device is formed as a double-funnel opening into said passage of said processing device.

9. A copying apparatus, comprising a separate bottom; a processing device for lazer beam graphic representation or for sheet film taking or sheet copying and having a housing with at least one slot; a handling device sheet films or sheets handling and having a housing, said handling device being located above said processing device, said housing of said processing device being supported on said bottom in a vibration-free manner and arranged in said housing of said handling device in a contact-free manner, said housing of said handling device being arranged on said bottom; a copying material support; and an immovable connecting part extending between said handling device and said copying material support of said processing device, said connecting part extending through said slot of said housing of said processing device in a contact-free manner relative to the same.

10. A copying apparatus as defined in claim 2, wherein said copying material support includes a sheet film support for supporting sheet film, said connecting part being a vacuum suction hose for producing a negative pressure on the sheet film to be supported on said sheet film support, said vacuum suction hose passing through said slot of said housing of said processing device in a contact-free manner.

11. A copying apparatus as defined in claim 10; and further comprising a suction unit arranged in said housing of said handling device and connected with said vacuum suction hose.

12. A copying apparatus as defined in claim 1, wherein said handling device has at least one dispenser magazine for accommodating a stack of copy carriers formed as sheet films or sheets, transporting means for transporting said copy carriers from said film magazine, said copying material support receiving said copy carriers from said transporting means, and further handling means receiving said copy carriers from said copying material support for for further handling.

13. A copying apparatus as defined in claim 12, wherein said handling device has a developing arrangement for the copy carriers formed as sheet films.

14. A copying apparatus as defined in claim 1, wherein said handling device has a sheet film cassette loading and unloading station, and a dispenser magazine from which a new sheet film is loaded into a sheet film cassette in said station.

15. A copying apparatus as defined in claim 1; and further comprising an electrical means determining a distance between said housing of said processing device and said housing of said handling device.

16. A copying apparatus as defined in claim 15, wherein said electrical determining means includes a measuring indicating device for measuring and indicating a distance between said housings of said devices.

17. A copying apparatus as defined in claim 15, wherein said electrical determining means includes a device generating and alarm in the event of contact between said housings of said devices.

* * * * *